(12) United States Patent
Clement et al.

(10) Patent No.: US 8,880,055 B1
(45) Date of Patent: Nov. 4, 2014

(54) METHOD AND APPARATUS FOR USING NEAR FIELD COMMUNICATION (NFC) TO PERFORM TRANSACTIONS ON A MOBILE DEVICE

(71) Applicant: Marvell International Ltd., Hamilton (BM)

(72) Inventors: Patrick Clement, Belmont (CH); Joelle Clement, Lausanne (CH); Jonathan Kuhn, Pully (CH); Antoine Moret, Preverenges (CH)

(73) Assignee: Marvell International Ltd., Hamilton (BM)

( * ) Notice: Subject to any disclaimer, the term of this patent is extended or adjusted under 35 U.S.C. 154(b) by 115 days.

(21) Appl. No.: 13/644,256

(22) Filed: Oct. 3, 2012

Related U.S. Application Data

(60) Provisional application No. 61/544,218, filed on Oct. 6, 2011, provisional application No. 61/546,369, filed on Oct. 12, 2011, provisional application No. 61/546,839, filed on Oct. 13, 2011, provisional application No. 61/570,765, filed on Dec. 14, 2011, provisional application No. 61/576,317, filed on Dec. 15, 2011.

(51) Int. Cl.
*H04M 3/00* (2006.01)

(52) U.S. Cl.
USPC ........... 455/420; 455/410; 455/411; 455/418; 455/419

(58) Field of Classification Search
USPC ............................ 455/410, 411, 418, 419, 420
See application file for complete search history.

(56) References Cited

U.S. PATENT DOCUMENTS

| | | | |
|---|---|---|---|
| 2007/0210162 A1* | 9/2007 | Keen et al. | 235/451 |
| 2008/0113791 A1* | 5/2008 | Williams et al. | 463/29 |
| 2009/0143104 A1* | 6/2009 | Loh et al. | 455/558 |
| 2009/0325491 A1* | 12/2009 | Bell et al. | 455/41.3 |
| 2010/0133338 A1* | 6/2010 | Brown et al. | 235/382 |
| 2010/0167643 A1* | 7/2010 | Hirsch | 455/41.3 |
| 2011/0260681 A1 | 10/2011 | Guccione et al. | |

FOREIGN PATENT DOCUMENTS

| | | |
|---|---|---|
| DE | 102004039651 | 3/2006 |
| WO | WO2008038203 | 4/2008 |
| WO | WO2009050624 | 4/2009 |
| WO | WO2010035256 | 4/2010 |
| WO | WO2010093969 | 8/2010 |

OTHER PUBLICATIONS

PCT Search Report and Written Opinion mailed Jun. 7, 2013 for PCT application No. PCT/IB2012/002636, 14 pages.

* cited by examiner

*Primary Examiner* — Rafael Pérez-Gutiérrez
*Assistant Examiner* — Thai Vu

(57) ABSTRACT

Some of the embodiments of the present disclosure provide method for initializing an extension device that acts as an extension of a communication device for communicating with a near field communication (NFC) device, wherein the NFC device operates in accordance with NFC standards, the method comprising discovering, by the communication device, the extension device over a first wireless communication link, wherein the first wireless communication link is a Bluetooth communication link; receiving, by the communication device, a default password associated with the extension device; and in response to receiving the default password associated with the extension device, configuring, by the communication device, the extension device such that the extension device communicates (i) with the communication device over the first wireless communication link and (ii) with the NFC device over a second wireless communication link. Other embodiments are also described and claimed.

17 Claims, 16 Drawing Sheets

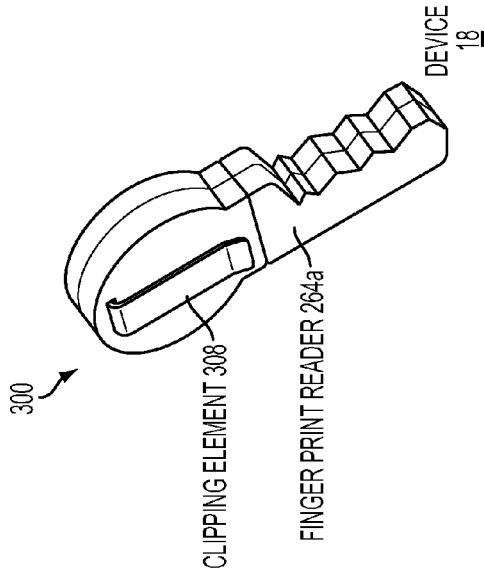
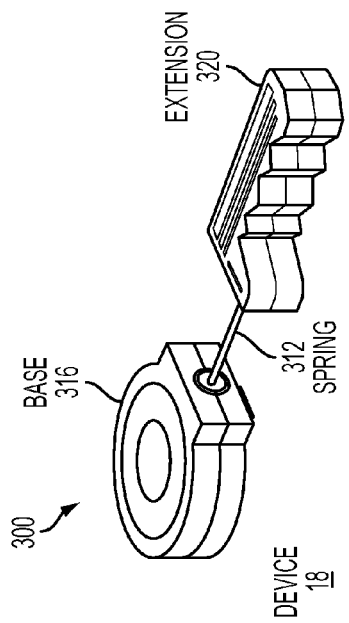
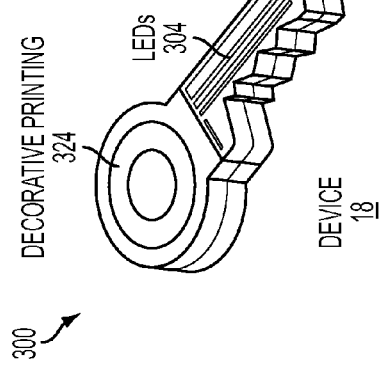

METHOD AND APPARATUS FOR USING NEAR FIELD COMMUNICATION (NFC) TO PERFORM TRANSACTIONS ON A MOBILE DEVICE

CROSS REFERENCE TO RELATED APPLICATIONS

The present disclosure claims priority to U.S. Provisional Patent Application No. 61/544,218, filed on Oct. 6, 2011, U.S. Provisional Patent Application No. 61/546,369, filed on Oct. 12, 2011, U.S. Provisional Patent Application No. 61/546,839, filed on Oct. 13, 2011, U.S. Provisional Patent Application No. 61/570,765, filed on Dec. 14, 2011, and U.S. Provisional Patent Application No. 61/576,317, filed on Dec. 15, 2011, which are incorporated herein by reference.

TECHNICAL FIELD

Embodiments of the present disclosure relate to data communications, and more specifically, to data communications over a mobile device.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Many modern mobile devices (e.g., smart phones) incorporate near field communication (NFC) chips. NFC is a wireless technology that allows two devices to wirelessly communicate over a short distance of about 10 cm or less. NFC is standardized internationally within NFC Forum specifications and defined in, for example, ISO/IEC 18092, ECMA-340, and ISO 14443, and the like, and any previous or subsequent versions. NFC technology is commonly used for contactless short-range communications based on radio frequency identification (RFID) standards, using magnetic field induction to enable communication between electronic devices, including mobile devices.

For example, a mobile device may be tapped on or waved near a passive NFC tag that stores information associated with, for example, a product or an institution. Based on the mobile device being tapped on or waved near the NFC tag, a NFC wireless communication link is established between the mobile device and the NFC tag, and the mobile device receives information stored in the NFC tag over the NFC wireless communication link.

In another example, NFC can be used to perform contactless financial transactions, e.g., those requiring a credit card. For example, a mobile device may be tapped on or waved near a contactless NFC reader terminal. Based on the mobile device being tapped on or waved near the NFC reader terminal, a NFC wireless communication link is established between the mobile device and the NFC reader terminal, and the mobile device communicates with the NFC reader terminal over the NFC wireless communication link to complete a financial transaction (e.g., pay for a subway train ticket, pay for parking at a parking lot, etc.).

In many situations, it may not be convenient to tap or wave a mobile device near a NFC device (e.g., a NFC tag, a NFC reader terminal, etc.), owing to a shape, a size and/or an availability of the mobile device. Furthermore, not all mobile devices may have NFC capability, yet it may be desired to use such mobile devices with NFC devices.

SUMMARY

In various embodiments, the present disclosure provides a method for initializing an extension device that acts as an extension of a communication device for communicating with a near field communication (NFC) device, wherein the NFC device operates in accordance with NFC standards, the method comprising discovering, by the communication device, the extension device over a first wireless communication link, wherein the first wireless communication link is a Bluetooth communication link; receiving, by the communication device, a default password associated with the extension device; and in response to receiving the default password associated with the extension device, configuring, by the communication device, the extension device such that the extension device communicates (i) with the communication device over the first wireless communication link and (ii) with the NFC device over a second wireless communication link.

In an embodiment, there is also provided an apparatus comprising a processor; a first antenna; a second antenna; a near field communication (NFC) module coupled to the first antenna; a Bluetooth module coupled to the second antenna, wherein the apparatus is configured to be discovered by the communication device over the Bluetooth wireless communication link, subsequent to the apparatus being discovered by the communication device and in response to a user of the apparatus entering a default password in the communication device, the apparatus is configured by the communication device such that (i) the NFC module communicates with a NFC device via the first antenna over a NFC wireless communication link, and (ii) the Bluetooth module communicates with the communication device via the second antenna over the Bluetooth wireless communication link.

BRIEF DESCRIPTION OF THE DRAWINGS

FIGS. 3A-3C, 4A-4B, 5A-5B, 6A-6B and 7 illustrate various example implementations of an extension device.

DETAILED DESCRIPTION

Figure 1:
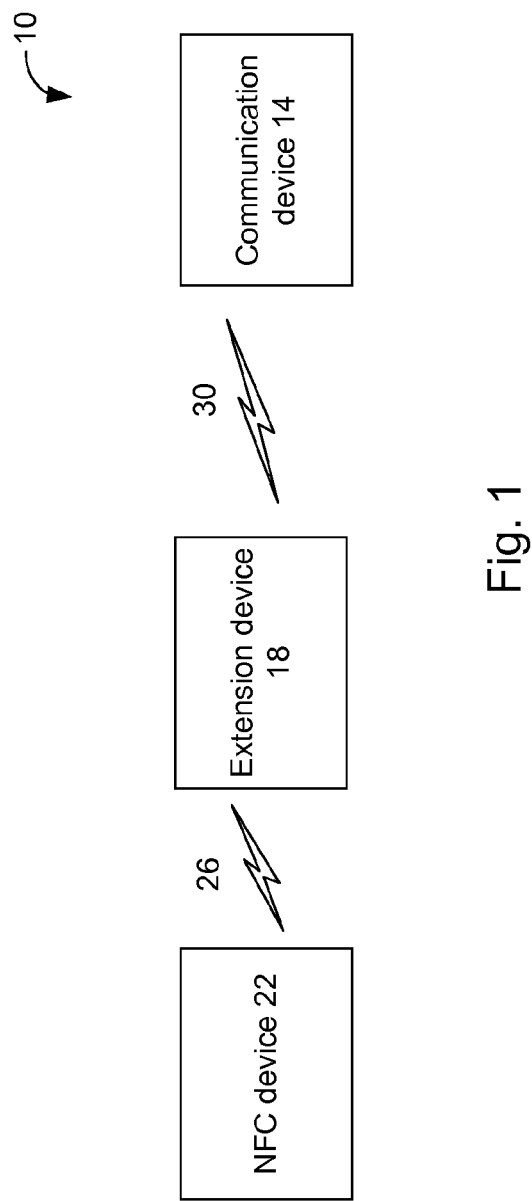
FIG. 1 schematically illustrates a system comprising an extension device communicating with (i) a communication device and (ii) a NFC device.

FIG. 1 schematically illustrates a system 10 comprising an extension device 18 (henceforth referred to as "device 18") communicating with (i) a communication device 14 (henceforth referred to as "device 14") and (ii) a NFC device 22. The NFC device 22 is configured to store information in accordance with the NFC standards, transmit and/or receive information in accordance with the NFC standards, and/or the like. In an example, the NFC device 22 is a passive NFC tag that stores information (e.g., information associated with a product, an institution, an event, and/or the like) in accordance with the NFC standards. In another example, the NFC device 22 is a NFC reader that is configured to read and/or receive information (e.g., in order to execute a financial transaction associated with, for example, buying a subway train ticket) from other NFC compatible devices (e.g., from the device 18).

In an embodiment, the device 18 communicates with the NFC device 22 over a wireless communication link 26. For example, the device 18 reads information stored in the NFC device 22 over the wireless communication link 26. In another example, the device 18 transmits information from the device 14 to the NFC device 22 over the wireless communication link 26.

In an embodiment, the wireless communication link 26 operates in accordance with the NFC standards (i.e., the wireless communication link 26 is a NFC communication link). The wireless communication link 26 is established, for example, by tapping the device 18 on the NFC device 22, waving the device 18 near the NFC device 22, and/or by placing the device 18 proximally to the NFC device 22 (e.g., such that the device 18 touches, or almost touches the NFC device 22).

The device 18 communicates with the device 14 over a wireless communication link 30. In an embodiment, the wireless communication link 30 operates in accordance with a Bluetooth standard. Bluetooth standards are described in "Specification of the Bluetooth System: Core, Version 1.1," published Feb. 22, 2001 by the Bluetooth Special Interest Group, Inc. Previous or subsequent versions of the Bluetooth standard may also be used. In an embodiment, Bluetooth low energy (BLE) of Bluetooth version 4.0 (adapted on Jun. 30, 2010) or later versions may be used for the wireless communication link 30 (e.g., in order to save power for communicating over the wireless communication link 30).

In an embodiment, the device 14 comprises any appropriate device for communicating over the wireless communication link 30 with the device 18, and receiving information from the NFC device 22 via the device 18. For example, the device 14 comprises one of a mobile telephone, a smart phone, a cellular telephone, a mobile computer, a handheld computer, a laptop computer, a tablet computer, a palmtop, a personal digital assistant (PDA), an access point, and/or the like.

In an embodiment, the device 14 is capable of communicating directly with the NFC device 22 (e.g., by bypassing the device 18), i.e., the device 14 has NFC communication capabilities. However, in another embodiment, the device 14 is not capable of communicating directly with the NFC device 22 (e.g., the device 14 does not have any NFC communication capabilities).

In an embodiment, when a user of the device 14 desires that the device 14 communicate with the NFC device 22 (e.g., to read information stored in the NFC device 22), the user of the device 14 uses the device 18 to communicate between the NFC device 22 and the device 14, via the wireless communication links 26 and 30. For example, the device 18 is placed proximally to the NFC device 22, based on which the device 18 communicates with the NFC device 22. For example, the device 18 receives information stored in the NFC device 22 via the wireless communication link 26. Once the device 18 reads information stored in the NFC device 22 via the wireless communication link 26, the device 18 then transmits (e.g., transmits substantially in real time) the information read from the NFC device 22 to the device 14 via the wireless communication link 30. The device 18, for example, stores and displays the information read from the NFC device 22 (or displays other appropriate information derived from the information read from the NFC device 22) on a display screen of the device 14. As the device 14 reads information from the NFC device 22 via the device 18, the device 18 acts as an extension to the device 14 in reading the NFC device 22.

In an embodiment in which each of the device 14 and the device 18 includes an NFC chip, the device 14 can be used to authenticate an NFC transaction (e.g., a payment transaction) that is processed through the device 14. For example, in one embodiment, a user of the device 14 can initiate an NFC transaction with an NFC device (e.g., by tapping, placing, or waving the device 14 proximate to the NFC device), and the NFC transaction can be completed based on the user tapping, placing, or waving the device 14 proximate to the NFC device. In such an embodiment, a user is required to use both the device 18 and the device 14 in order to complete an NFC transaction. The device 18 can be associated with the device 14 (or authenticated) based on techniques described below.

Figure 2A:
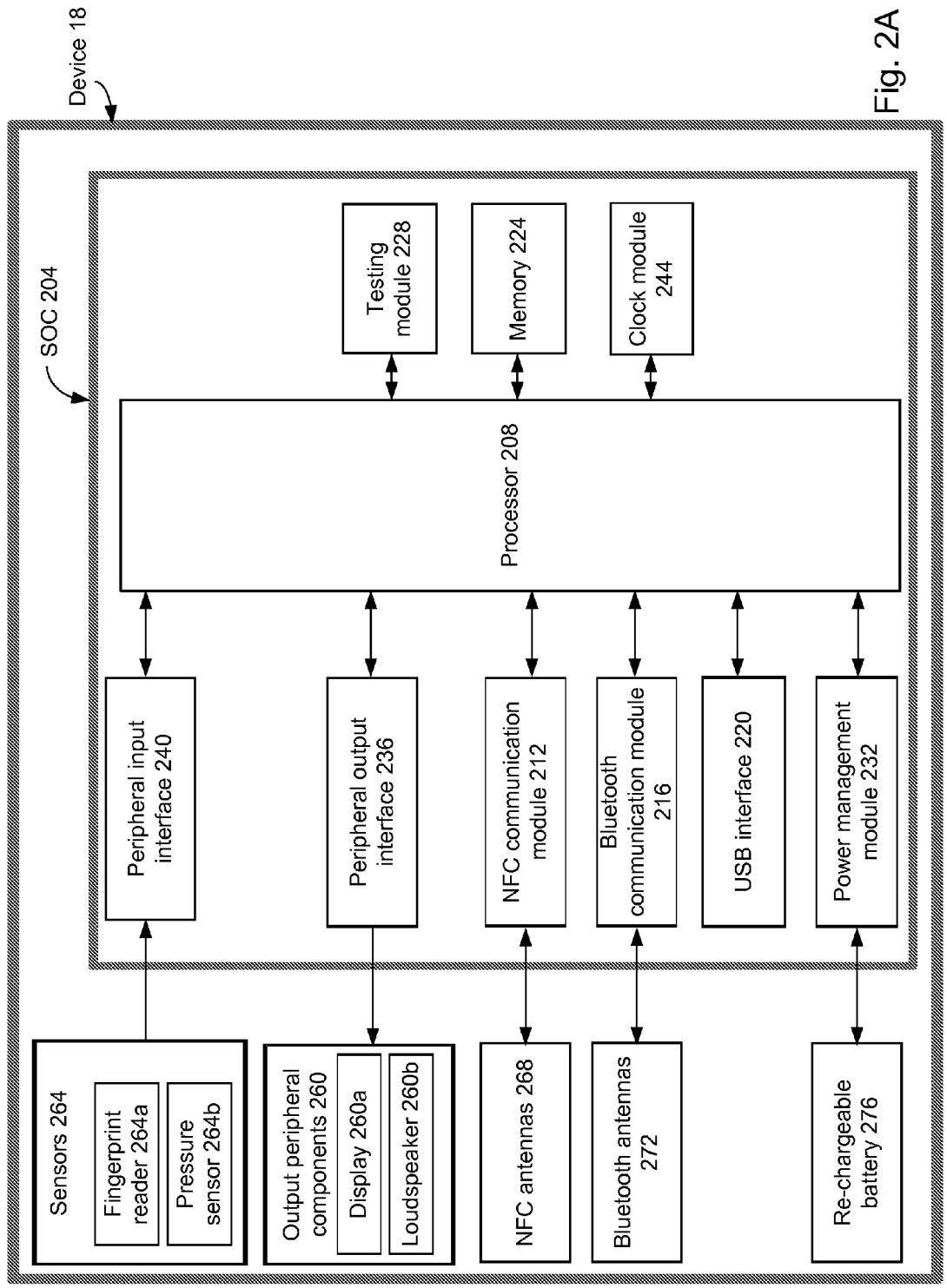
FIG. 2A illustrates an example architecture of the extension device of FIG. 1.

FIG. 2A illustrates an example architecture of the device 18. In an embodiment, the device 18 comprises a System on a Chip (SOC) 204. The SOC 204 comprises a processor 208 coupled to a memory 224. The processor 208 may be configured to execute instructions, which may be stored in the memory 224, or in other computer-readable media accessible to the processor 208.

The SOC 204 further comprises a NFC communication module 212 coupled to NFC antennas 268 of the device 18. The NFC communication module 212 is configured to communicate with the NFC device 22 using the NFC antennas 268. For example, during a read mode of the device 18, the NFC communication module 212 communicates with the NFC device 22 to read information from the NFC device 22 using the NFC antennas 268.

The SOC 204 further comprises a Bluetooth communication module 216 coupled to Bluetooth antennas 272 of the device 18. The Bluetooth communication module 216 is configured to communicate with the device 14 using the Bluetooth antennas 272 over the wireless communication link 30. For example, during a read mode of the device 18, the device 18 reads information from the NFC device 22, and the Bluetooth communication module 216 transmits the information to the device 14 using the Bluetooth antennas 272 over the wireless communication link 30.

In an embodiment, the SOC 204 further includes a Universal Serial Bus (USB) interface 220 providing USB capability to the device 18. For example, although not illustrated in FIG. 2A, the device 18 includes a micro-USB port coupled to the USB interface 220. The device 18 may be coupled, for example, to the device 14 using the USB interface 220. In an example, the USB interface 220 is used to charge a rechargeable battery 276 of the device 18. In another example, the USB interface 220 is used to configure the device 18 from the device 14. In another embodiment and although not illustrated in FIG. 2A, an USB interface is not present in the device 18. In such an embodiment, no USB port is present in the device 18, and the rechargeable battery 276 is charged in other appropriate manner (e.g., using a dedicated changing port, charged inductively from a changing device, etc.).

The SOC 204 further comprises the memory 224, which includes computer-readable storage media (CRSM). The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, and/or any other medium which can be used to store the desired information and which can be accessed by the processor 208. In an embodiment, the memory 224 comprises RAM, ROM, flash memory, and/or the like. In an embodiment, the memory 224 (or a part of the memory 224) is used to buffer data read from the NFC device 22 over the wireless communication link 26, before transmitting the data to the device 14 over the wireless communication link 30.

The SOC 204 further comprises a testing module 228 for testing the SOC 204 and/or other components of the device 18. The SOC 204 further comprises a power management module 232. The power management module 232 is configured to, for example, enable the device 18 to enter a low power mode (e.g., a sleep mode) of operation while the device 18 is not active, and enter an active mode of operation while the device 18 is actively communicating with the NFC device 22 and/or the device 14 (or performing other appropriate operations that require the device 18 to be in the active mode of operation). In an embodiment, the power management module 232 is also configured to, for example, charge the rechargeable battery 276, e.g., based on power received from an appropriate power source (e.g., from the device 14 over the USB interface 220). In another embodiment, power for charging the rechargeable battery 276 and/or powering the device 18 are received by inductively coupling the device 18 with an appropriate power source (e.g., the device 14).

The SOC 204 further comprises a peripheral input module 240 for receiving input from one or more input peripherals of the device 14, and a peripheral output module 244 for transmitting output to one or more output peripherals of the device 14. For example, the device 18 comprises one or more sensors 264, e.g., a finger print reader 264a, a pressure sensor 264b, and/or the like. The peripheral input module 240 is configured to receive input from the one or more sensors 264. Although FIG. 2A illustrates only two example sensors of the sensors 264, in an embodiment, the device 18 may include any other types of sensors, e.g., a light sensor, a temperature sensor, a blood pressure sensor, a skin moisture sensor, a camera (e.g., used for authenticating an authorized user of the device 18 through facial recognition), a capacitive sensor, an inductive sensor, a microphone, etc. (e.g., based on an application area of the device 18).

In an embodiment, one or more of the sensors of the device 18 provides an analog output. In such a case, the peripheral input module 240 comprises an analog to digital (A/D) convertor (not illustrated in FIG. 2A) to appropriately convert the analog output of the sensors to digital data, for providing to the processor 208.

In an embodiment and as will be discussed further in detail, the finger print reader 264a is used to authenticate a finger print of an authorized user of the device 18. Accordingly, in some implementations, the peripheral input module 240 is coupled to the finger print reader 264a via, for example, a secure element interface (not illustrated in FIG. 2A). The secure element interface may be included in the SOC 204, or be external to the SOC 204. In an embodiment, the secure element interface is configured to encrypt communication between the finger print reader 264a and the processor 208, store finger prints of one or more authorized users of the device 18, one or more passwords associated with the device 18, and/or provide other security associated services.

The device 18 comprises one or more output peripheral components 260, which are driven by the peripheral output interface 236. The output peripheral components 260, for example, comprise a display 260a (which includes, for example, a plurality of light emitting diodes (LEDs)), a loudspeaker 260b, and/or the like. Although FIG. 2A illustrates only two examples of the output peripheral components 260, in an embodiment, the device 18 may include any other types of output peripheral components, e.g., a ringer, a vibrator, etc. (e.g., based on an application area of the device 18).

In an embodiment, while the device 18 reads information from the NFC device 22, the device 18 outputs status message of the read operation via one or more of the output peripheral components 260. For example, when the device 18 is accessing the NFC device 22, one or more LEDs of the display 260a emit light in a particular fashion to indicate the same. In another example, when the device 18 has completed reading the NFC device 22, another one or more LEDs of the display 260a emit light in another particular fashion to provide a confirmation of reading the NFC device 22. Additionally or alternatively, the loudspeaker 260b produces a certain type of sound to provide the confirmation of reading the NFC device 22. In another example, the display 260a and/or the loudspeaker 260b provide appropriate indications once information, which is read from the NFC device 22, is successfully transmitted to the device 14.

The SOC 204 further comprises a clock module 244 configured to generate one or more clock signals used by various components of the device 18. For example, the clock module 244 comprises a reference oscillator, a phase locked loop (PLL) and/or the like to generate a reference clock for use by various components of the device 18.

Although FIG. 2A illustrates the SOC 204 comprising various components, in another embodiment, one or more of these components may be external to the SOC 204. For example, the testing module 228 may be included in the device 18, but may be external to the SOC 204.

Figure 2B:
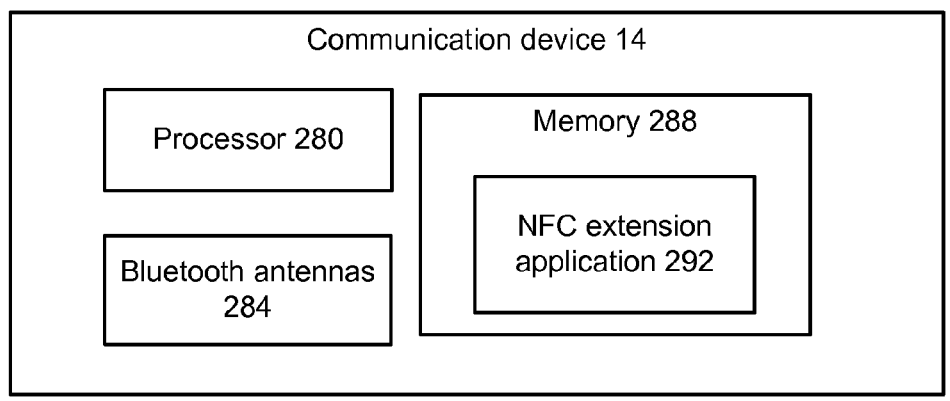
FIG. 2B illustrates an example architecture of the communication device of FIG. 1.

FIG. 2B illustrates an example architecture of the device 14. In an embodiment, the device 14 comprises a processor 280 coupled to a memory 288. The processor 280 may be configured to execute instructions, which may be stored in the memory 288, or in other computer-readable media accessible to the processor 280.

The memory 288 includes computer-readable storage media (CRSM). The CRSM may be any available physical media accessible by a computing device to implement the instructions stored thereon. CRSM may include, but is not limited to, RAM, ROM, EEPROM, flash memory or other memory technology, compact disk read-only memory (CD-ROM), digital versatile disks (DVD) or other optical disk storage, a Subscriber identity module (SIM) card, magnetic cassettes, magnetic tape, magnetic disk storage or other magnetic storage devices, and/or any other medium which can be used to store the desired information and which can be accessed by the processor 280.

In an embodiment, the memory 288 stores a plurality of applications, e.g., a NFC extension application 292, and various other applications for proper operation of the device 14. In another embodiment, one or more applications (e.g., including the NFC extension application 292) is stored in a memory included in a System on a Chip (SoC, not illustrated in FIG. 2B), where the SoC also includes, for example, the processor 280. The NFC extension application 292, when executed by the processor 280, controls communication between the device 14 and the device 18. The device 14 also comprises Bluetooth antennas 284 configured to transmit and receive data over the wireless communication link 30. The device 14 comprises a plurality of other components, which are not illustrated in FIG. 2B for illustrative clarity. For example, the device 14 comprises a display, a key pad, rechargeable batteries, one or more input and output interfaces, a power management module, a clock module, and/or the like.

Example Implementation of an Extension Device

FIGS. 3A-3C illustrate various views of an example implementation 300 of the device 18. In the example implementation 300 of FIGS. 3A-3C, the device 18 has a shape that is similar to a shape of a key. As illustrated in FIG. 3C, the device 18 has a base 316 and an extension 320. The extension 320 is attached to the base 316 using a spring 312, as illustrated in FIG. 3C.

As illustrated in FIG. 3B, the base 316 has a clipping element 308 (e.g., a hook). The clipping element 316 can be used to clip or attach the device 18 in, for example, a dress (e.g., a shirt), a belt, a handbag or other appropriate accessory that is generally to be carried by a user of the device 18.

While the device 18 is not in use, the extension 320 is adjacent to the base 316, i.e., the spring 312 is rolled in, as illustrated in FIGS. 3A and 3B. Also, the device 18 is clipped to, for example, the user's shirt using the clipping element 308.

When the user desires to use the device 18 to, for example, read the NFC device 22, the user pulls the extension 320 towards the NFC device 22 (e.g., while the base 316 is still clipped in the user's shirt). The spring 312 rolls out (e.g., as illustrated in FIG. 3C), enabling the movement of the extension 320 towards the NFC device 22 while the base 316 is still clipped in the user's shirt. Once the device 18 reads the NFC device 22 and transmits to the device 14, the user can stop pulling the extension 320 out of the base 316. Due to the rolling in action of the spring 312, the extension 320 is then pulled back to the original position, i.e., adjacent to the base 316 (e.g., as illustrated in FIGS. 3A and 3B).

In an embodiment, in the example implementation 300, various components of the device 18 illustrated in FIG. 2A are housed in the extension 320. In an embodiment, an outer surface of the extension 320 houses LEDs 304, which are part of the display 260a of FIG. 2A. For example, the LEDs 304 are used to provide confirmation of reading the NFC device 22 and/or transmitting information from the device 18 to the device 14. In an embodiment, the LEDs 304 comprise various colors of LEDs. For example, green LEDs can glow to provide confirmation of reading the NFC device 22 and/or transmitting information from the device 18 to the device 14; red LEDs can glow if the reading and/or transmitting are unsuccessful; and yellow LEDs can glow while the reading of the NFC device 22 and/or transmission of the information from the device 18 to the device 14 is currently occurring.

In an embodiment, decorative printing 324 are imprinted on a surface of the base 316. In an embodiment, the decorative printing 324 matches with the LEDs 304, to provide an aesthetic look to the device 18. In an embodiment, various information about the device 18 are printed on the surface of the base 316.

In an embodiment, a back surface of the extension 320 (e.g., the surface that is opposite to the surface housing the LEDs 304) houses the finger print reader 264a. While or subsequent to the user of the device 18 pulling the extension 320 out towards the NFC device 22, the user touches the finger print reader 264a using a finger. The finger print reader 264a senses such a touch, based on which the device 18, for example, transitions from the low power mode to the active mode, authenticates the user as an authorized user of the device 18, and/or the like. Although not illustrated in FIGS. 3A-3C, the device 18 includes, for example, a camera (e.g., used for authenticating an authorized user of the device 18 through facial recognition), an USB connector (e.g., a micro-USB connector coupled to the USB interface 220 of FIG. 2A), and/or the like.

Figure 4A:
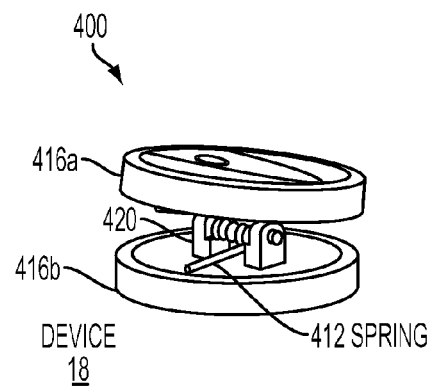
Figure 4B:
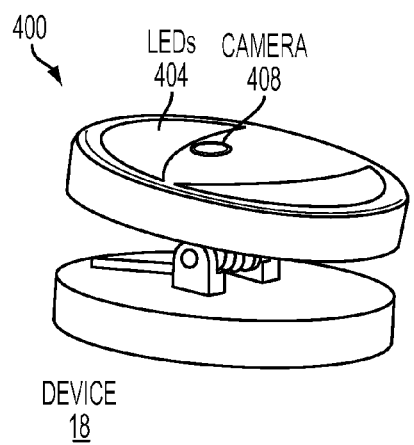

FIGS. 4A and 4B illustrate various views of an example implementation 400 of the device 18. In the example implementation 400 of FIGS. 4A and 4B, the device 18 has two components 416a and 416b, which are joined by a component 420. The component 420 includes a spring 412. The spring 412 tries to bring a section of the component 416a close to a section of the component 416b, such that the device 18 can be clipped to, for example, a user's dress, handbag, belt or the like. When the user of the device 18 intends to use the device 18 to read the NFC device 22, the user de-clips the device 18, e.g., by pressing the components 416a and 416b at appropriate positions and brings the device 18 close to the NFC device 22.

In an embodiment, various components of the device 18 illustrated in FIG. 2A are housed in the component 416a and/or the component 416b. In an embodiment, an outer surface of the component 416a houses LEDs 404, which are part of the display 260a of FIG. 2A. For example, the LEDs 404 are used to provide confirmation of reading the NFC device 22 and/or transmitting information from the device 18 to the device 14. In an embodiment, the outer surface of the component 416a also houses a camera 408 (e.g., used for authenticating an authorized user of the device 18 through facial recognition). Although not illustrated in FIGS. 4A and 4B, the device 18 includes, for example, finger print reader 264a, an USB connector (e.g., a micro-USB connector coupled to the USB interface 220 of FIG. 2A), and/or the like.

Figure 5A:
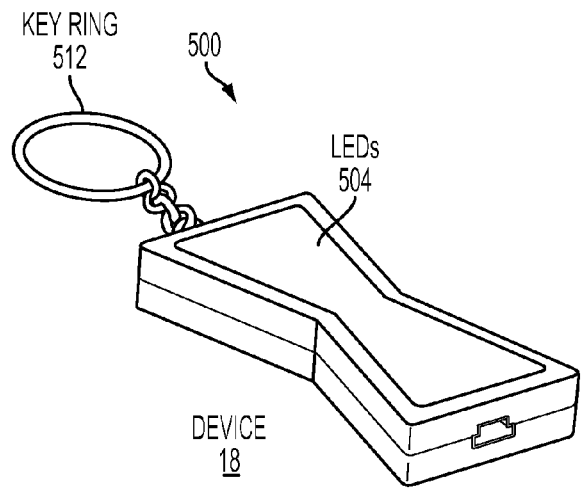
Figure 5B:
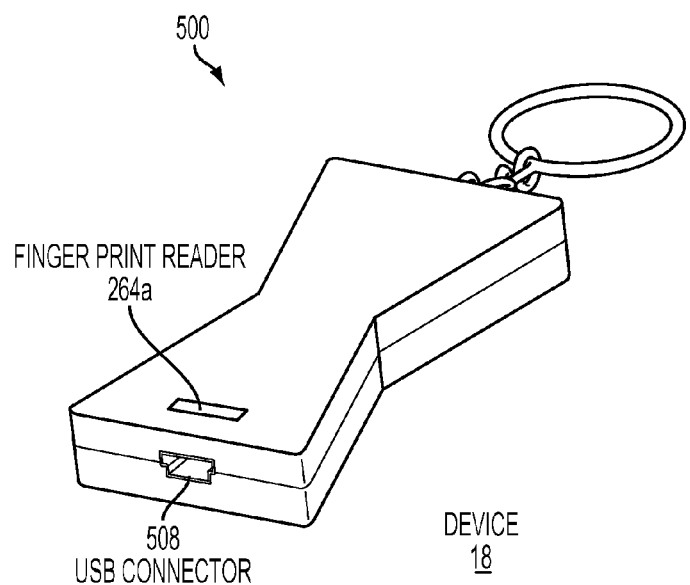

FIGS. 5A and 5B illustrate various views of an example implementation 500 of the device 18. In an embodiment, in the example implementation 500 of FIGS. 5A and 5B, the device 18 is attached to a key ring 512. In an embodiment, a first surface of the device 18 houses LEDs 504, which are part of the display 260a of FIG. 2A. For example, the LEDs 504 are used to provide confirmation of reading the NFC device 22 and/or transmitting information from the device 18 to the device 14. In an embodiment, a second surface of the device 18 houses a finger print reader 264a. The device 18 also includes a USB connector 508 (e.g., a micro-USB connector coupled to the USB interface 220 of FIG. 2A), which is used to charge the re-chargeable battery 276 and/or to configure the device 18 from the device 14. Although not illustrated in FIGS. 5A and 5B, the device 18 includes, for example, a camera (e.g., used for authenticating an authorized user of the device 18 through facial recognition).

Figure 6A:
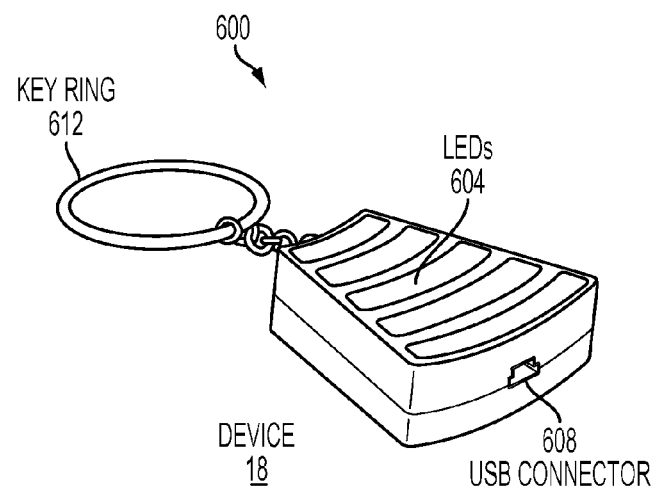
Figure 6B:
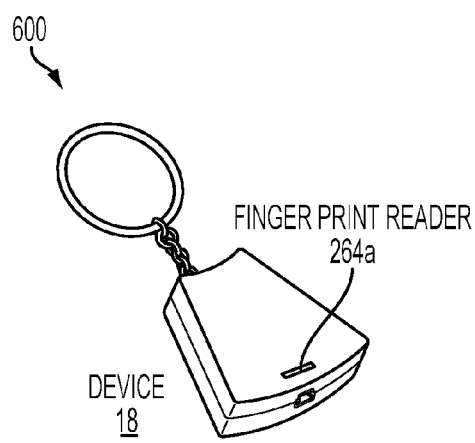

FIGS. 6A and 6B illustrate various views of an example implementation 600 of the device 18. In the example implementation 600 of FIGS. 6A and 6B, the device 18 is attached to a key ring 612. In an embodiment, a first surface of the device 18 houses LEDs 604, which are part of the display 260a of FIG. 2A. For example, the LEDs 604 are used to provide confirmation of reading the NFC device 22 and/or transmitting information from the device 18 to the device 14. In an embodiment, a second surface of the device 18 houses a finger print reader 264a. In the example implementation 600, the device 18 also includes an USB connector 608 (e.g., a micro-USB connector coupled to the USB interface 220 of FIG. 2A), which is used to charge the re-chargeable battery 276 and/or to configure the device 18 from the device 14. Although not illustrated in FIGS. 6A and 6B, the device 18 includes, for example, a camera (e.g., used for authenticating an authorized user of the device 18 through facial recognition).

Figure 7:
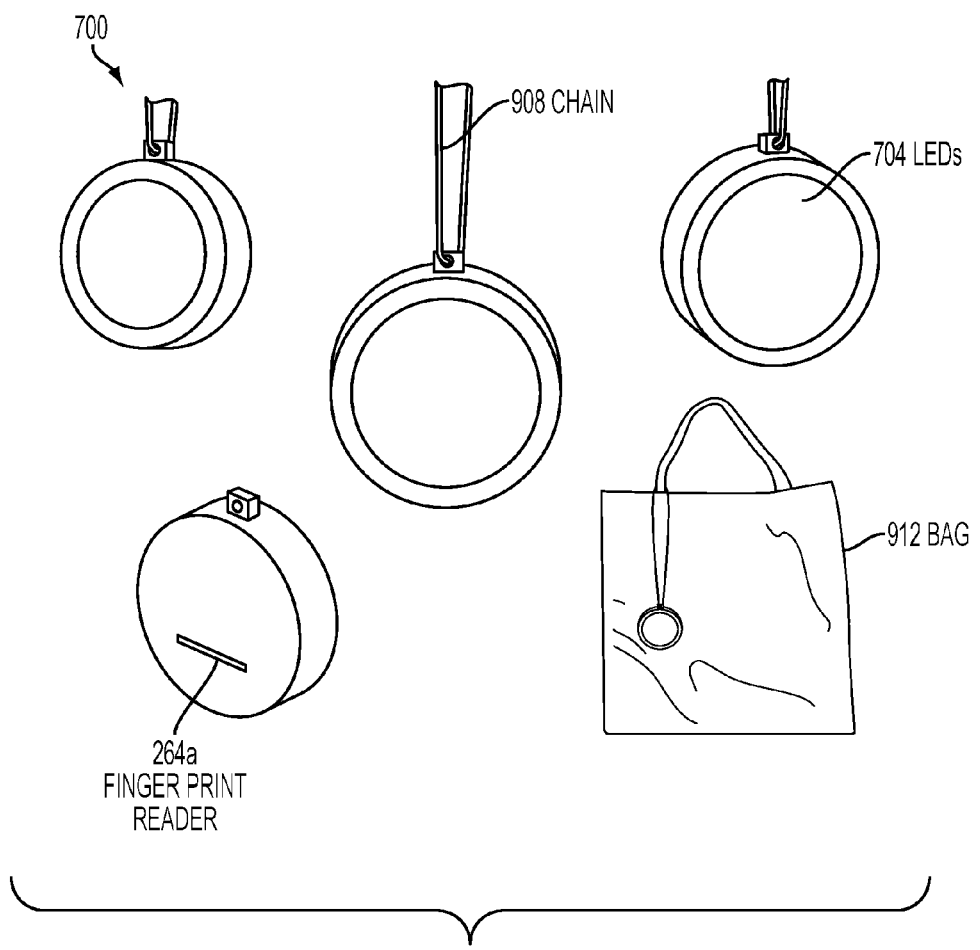

FIG. 7 illustrates various views of an example implementation 700 of the device 18. In the example implementation 700 of FIG. 7, the device 18 is attached to a chain 908. The chain can be hanged, for example, from a user's neck, a purse, a handbag, and/or the like. For example, FIG. 7 illustrates an example of the device 18 hanging from a bag 912.

In an embodiment, a first surface of the device 18 houses LEDs 704, which are part of the display 260a of FIG. 2A. For example, the LEDs 704 are used to provide confirmation of reading the NFC device 22 and/or transmitting information from the device 18 to the device 14. In an embodiment, a second surface of the device 18 houses a finger print reader 264a. Although not illustrated in FIG. 7, the device 18 includes, for example, a camera (e.g., used for authenticating an authorized user of the device 18 through facial recognition), an USB connector (e.g., a micro-USB connector coupled to the USB interface 220 of FIG. 2A), and/or the like.

The example implementations 300-700 illustrate example shapes of the device 18. However, the device 18 can be of any other appropriate shapes, as would be readily appreciated by those skilled in the art based on the teachings of this disclosure.

Example Operation of an Extension Device

Figure 8:
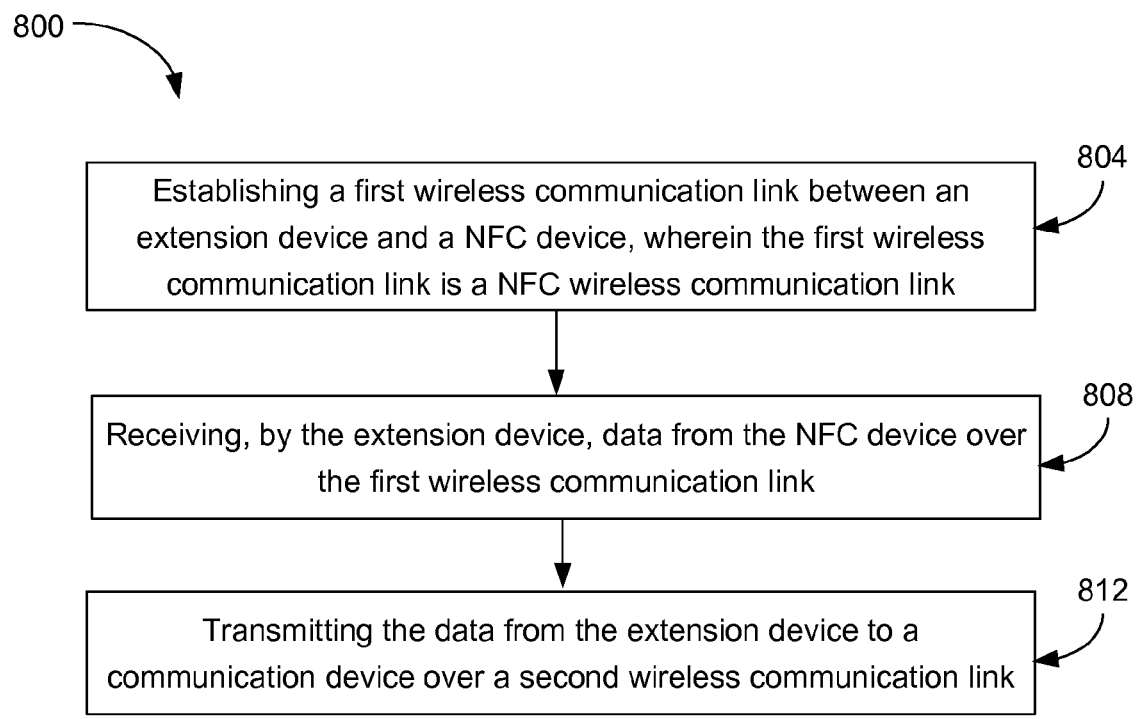
FIG. 8 illustrates an example method for operating an extension device.

FIG. 8 illustrates an example method 800 for operating an extension device, e.g., the device 18 of FIG. 1. At 804, a first wireless communication link (e.g., the wireless communication link 26) is established between an extension device (e.g., the device 18) and a NFC device (e.g., the NFC device 22). The first wireless communication link is a NFC wireless communication link. The first wireless communication link is established, for example, by placing the extension device in close proximity to the NFC device (e.g., such that the extension device touches, or almost touches the NFC device).

At 808, the extension device receives data from the NFC device over the first wireless communication link. In an embodiment, once the data is received from the NFC device, the extension device provides a confirmation of the receipt of data. For example, the extension device comprises a plurality of LEDs, which are illuminated in a specific manner (e.g., LEDs of a specific color are illuminated) to provide a visual confirmation of the receipt of data from the NFC device. In another example, the extension device comprises a loudspeaker or a vibrator, which is activated in a specific manner (e.g., the loudspeaker emits a predetermined sound) to provide confirmation of the receipt of data from the NFC device.

At 812, the data from the extension device is transmitted to a communication device (e.g., the device 14) over a second wireless communication link (e.g., the wireless communication link 30). In an embodiment, the second wireless communication link is a Bluetooth link.

Figure 9:
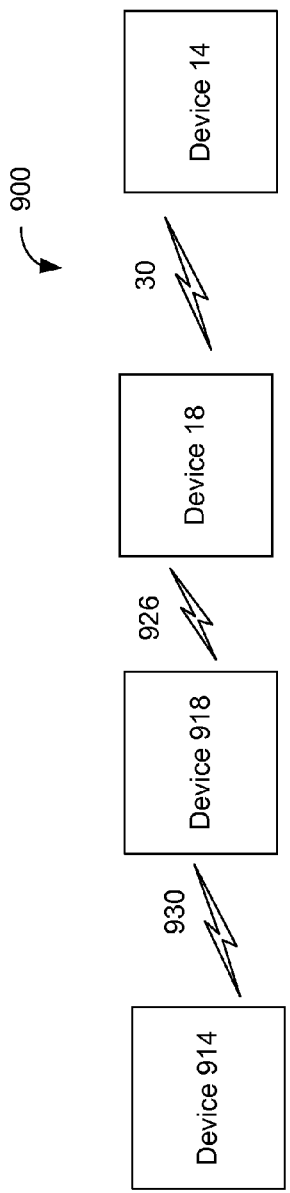
FIG. 9 illustrates a system in which an extension device communicates with another extension device over a wireless communication link.

FIGS. 1 and 8 illustrate the device 18 communicating with a NFC device (e.g., the NFC device 18). However, in another embodiment, the device 18 can be used in a different manner. For example, FIG. 9 illustrates a system 900 in which the device 18 communicates with another extension device 918 (henceforth referred to as "device 918") over a wireless communication link 926. The device 918 in turn communicates with another communication device 914 (henceforth referred to as "device 914") over a wireless communication link 930.

The device 914 may be at least in part similar to the device 14. For example, the device 914 comprises one of a mobile telephone, a cellular telephone, a smart phone, a PDA, a mobile computer, a handheld computer, a laptop computer, a tablet computer, a palmtop, and/or the like.

The device 918 may be at least in part similar to the device 18. For example, the device 918 is configured to communicate with NFC devices (or another extension device, e.g., the device 18) using NFC standards (e.g., over the NFC communication link 926) and communicate with the device 914 using Bluetooth communication link 930.

The devices 18 and 918 communicate over the wireless communication link 26 using NFC standards. For example, if the user of the device 14 intends to transmit information to the device 914, the user establishes connection between the devices 18 and 918 using NFC standards. The device 18 receives the information from the device 14 (e.g., using the wireless communication link 30), and transmits the information to the device 918 (e.g., using the wireless communication link 926). The device 918 transmits the information to the device 914 (e.g., using the wireless communication link 930). Information can similarly be transmitted from the device 914 to the device 14 via the devices 918 and 18, and the NFC wireless communication link 926.

In an embodiment, information exchange between devices 14 and 914, via (i) the devices 918, 18, and (ii) the NFC wireless communication link 926, is based on configuration parameters and authentication parameters associated with the devices 14 and 914. For example, the device 14 can be configured to share a first one or more files with another device (e.g., device 914) without any authentication requirement, and/or share a second one or more files with another device (e.g., device 914) after proper authentication. Such an authentication can be carried out by, for example, entering identification and password in the device 914, and/or by using the finger print reader and/or the camera (e.g., for facial authentication) of the device 918.

Figure 10:
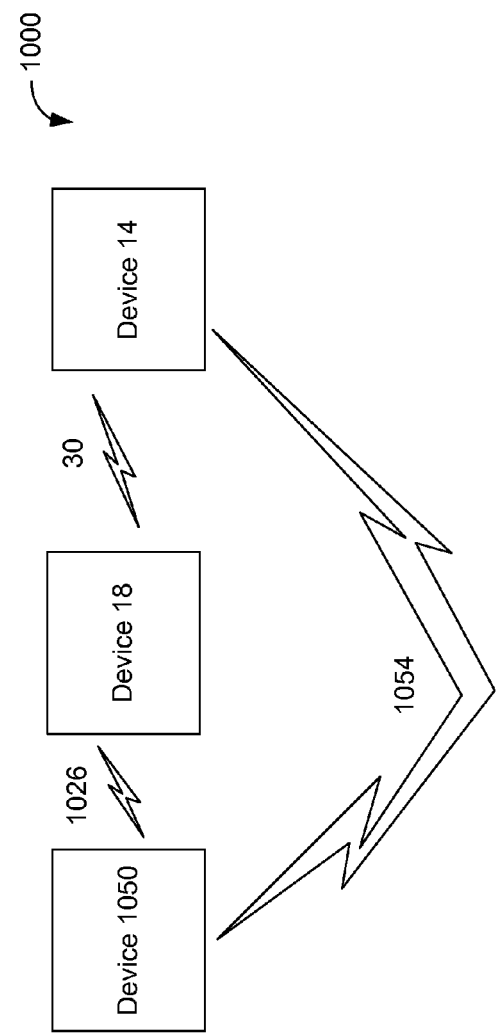
FIG. 10 illustrates a system comprising an extension device communicating with (i) a communication device over a wireless communication link and (ii) another device over another wireless communication link.

FIG. 10 illustrates a system 1000 comprising the device 18 communicating with (i) the device 14 over the wireless communication link 30 and (ii) another device 1050 over a wireless communication link 1026. The device 1050 is an appropriate device having NFC communication capability. For example, when the devices 1050 and 18 are placed in close proximity, the wireless communication link 1026, which operates according to the NFC standards, is established. The device 1050 is, for example, a computing device (e.g., a mobile computer, a handheld computer, a laptop computer, a tablet computer, or the like), a loudspeaker having NFC communication capability, an access point, or the like.

In an embodiment, the device 1050 is a loudspeaker having NFC communication capability (although, in another embodiment, the device 1050 may be a different type of device). The user of the device 14 intends to play songs (e.g., which are stored in the device 14) in the device 1050. Initially, the device 18 establishes the wireless communication link 1026 in accordance with the NFC standards. The device 18 then configures the device 1050 using the NFC wireless communication link 1026, via the device 18. For example, the user of the device 14 transmits a list of songs from the device 14 to the device 1050, via the device 18.

The wireless communication link 1026 is a NFC wireless communication link, and may have limited bandwidth. Accordingly, uploading the songs from the device 14 to the device 1050, via the device 18 and the wireless communication link 1026, may be time consuming. Accordingly, the user of the device 14 configures the device 1050, via the device 18 and the wireless communication link 1026, to establish another wireless communication link 1054 between the devices 14 and 1050. The wireless communication link 1054 is, for example, a Bluetooth wireless communication link, a Wi-Fi wireless communication link, or the like. Once the wireless communication link 1054 is established, the device 14 transmits the songs of the song list (which was, for example, transmitted to the device 1050 earlier via the wireless communication link 1026) via the wireless communication link 1054, based on which the loudspeaker device 1050 plays the songs. Thus, in the system 1000, the device 18 and the NFC wireless communication link 1026 facilitates initiation of communication between the device 14 and the device 1050, and also facilitates initial configuration of the device 1050 from the device 14.

Figure 11:
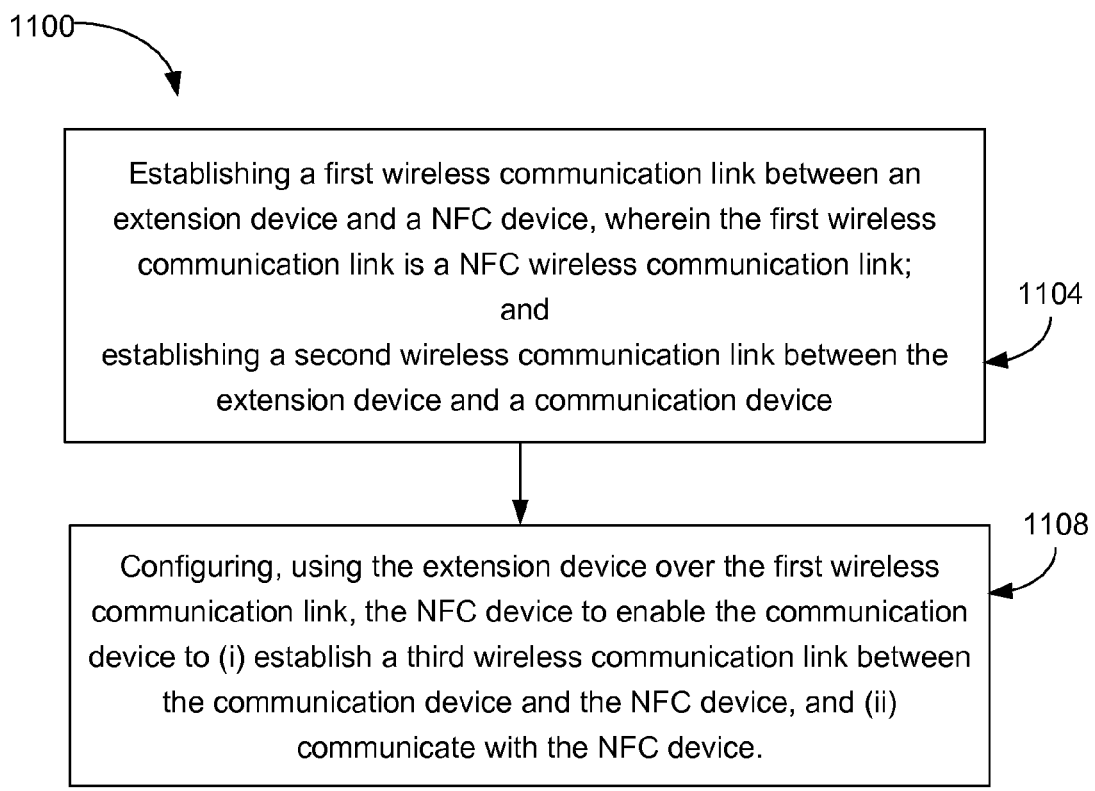
FIG. 11 illustrates an example method for operating the system of FIG. 10.

FIG. 11 illustrates an example method 1100 for operating the system 1000 of FIG. 10. At 1104, a first wireless communication link (e.g., the wireless communication link 1026 of FIG. 10) is established between an extension device (e.g., the device 18) and a NFC device (e.g., the device 1050). The first wireless communication link is a NFC wireless communication link. Also at 1104, a second wireless communication link (e.g., the wireless communication link 30) is established between the extension device and a communication device (e.g., the device 14). At 1108, using the extension device over the first wireless communication link, the NFC device is configured from the communication device (e.g., by a user of the communication device) to enable the communication device to (i) establish a third wireless communication link (e.g., the wireless communication link 1054) between the communication device and the NFC device, and (ii) communicate with the NFC device over the third wireless communication link.

Power Management and Operating Modes in an Extension Device

In an embodiment, in order to save power, the device 18 of FIGS. 1-2A periodically enters a low power mode or a sleep mode of operation. For example, the device 18 is in an active mode of operation when the device 18 is engaged in communication with the NFC device 22 and/or the device 14. When the device 18 is not engaged in communication with the NFC device 22 and/or the device 14 for at least a threshold period of time, the device 18 enters the low power mode. For example, a timer (e.g., included in the power management module 232 of FIG. 2A) keeps track of a time after the device 18 last engaged in communication with the NFC device 22 and/or the device 14 (e.g., keeps track of the time after the NFC antennas 268 and the Bluetooth antennas 272 were last active). Based on the timer exceeding the threshold period of time (e.g., which may be a few seconds), the device 18 enters the low power mode.

In an embodiment, while in the low power mode, the device 18 switches off (or reduces power to) one or more components of the device 18 (e.g., switches off the NFC antennas 268, the Bluetooth antennas 272, output peripheral components 260 and/or various other components included in the SOC 204 of FIG. 2A).

Referring again to FIG. 2A, in an embodiment, while the device 18 is in the low power mode, one or more of the sensors 264 are kept on. For example, the finger print reader 264a (illustrated in FIGS. 2A, 3a-7) and the associated circuitry (e.g., the peripheral input interface 240 of FIG. 2A) are kept on while the device 18 is in the low power mode. When a user of the device 18 wants to use the device 18 (e.g., to communicate with the NFC device 22), the user touches (e.g., using a finger) the finger print reader 264a. The finger print reader 264a senses such a touch, based on which the device 18 transitions from the low power mode to the active mode. In another embodiment, instead of (or in addition to) the finger print reader 264a, another sensor (e.g., a capacitive sensor, a pressure sensor, or the like, not illustrated in FIG. 2A) can be used to sense the touch of the user, and enable the device 18 to transition from the low power mode to the active mode.

Figure 12:
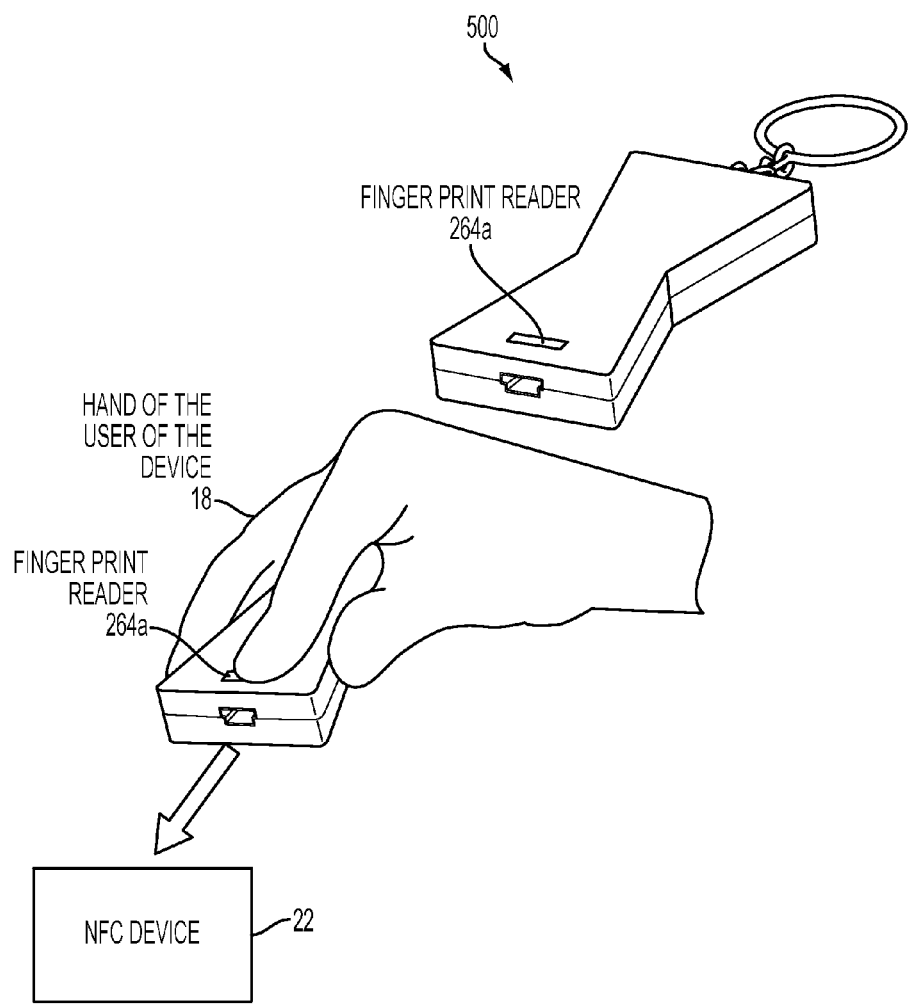
FIG. 12 illustrates a user of an extension device touching a finger print reader of an extension.

In an embodiment, the finger print reader 264a is located in the device 18 in such a position that the user of the device 18 most probably will touch the finger print reader 264a (e.g., will touch the finger print reader 264a with high probability) while placing the device 18 near the NFC device 22. For example, referring again to FIGS. 3A-3C, in the implementation 300 of the device 18, the finger print reader 264a is located in the extension 320. The user has to pull the extension 320 towards the NFC device 22. The finger print reader 264a is located in the extension 320 such that the user of the device 18 most probably will touch the finger print reader 264a while placing the device 18 near the NFC device 22. In the implementations 400-700 of the device 18, the finger print reader 264a is also conveniently located in the device 18 such that the user of the device 18 most probably will touch the finger print reader 264a while placing the device 18 near the NFC device 22. For example, FIG. 12 illustrates the user of the device 18 touching the finger print reader 264a of the implementation 500 (of FIGS. 5A and 5B) of the device 18, while bringing the device 18 near the NFC device 22.

In an embodiment, when the device 18 transitions from the low power mode to the active mode, the device 18 provides an indication by, for example, blinking an LED (e.g., a green LED). Similarly, when the device 18 transitions from the active mode to the low power mode, the device 18 provides another indication by, for example, blinking another LED (e.g., a red LED).

In an embodiment, instead of or in addition to transitioning from the low power mode to the active mode based on activating a sensor (e.g., the finger print reader 264a), the device 18 periodically (e.g., every few milliseconds, or every few seconds, which is maintained by a timer) enters from the low power mode to the active mode. When the device 18 enters the active power mode, the device 18 senses for a presence of a NFC device in vicinity, e.g., by sensing (i) presence of NFC electromagnetic field from another NFC device, and/or (i) a modulation of a NFC electromagnetic field of the device 18 by another NFC device. If the device 18 senses the presence of another NFC device (e.g., NFC device 22) in vicinity, the device 18 remains in the active mode and communicates with the detected NFC device. If the device 18 fails to sense the presence of another NFC device in vicinity, the device 18 again enters the low power mode.

Figure 13:
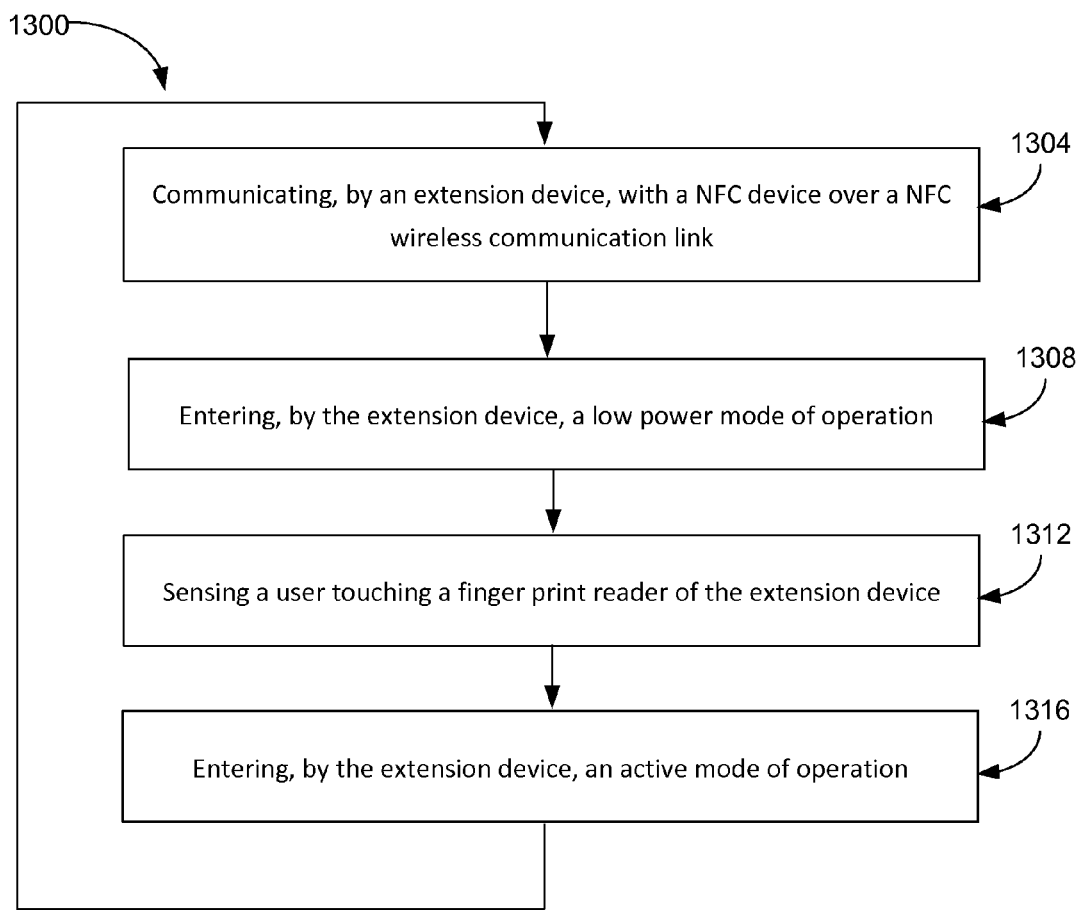
FIG. 13 illustrates an example method for operating an extension device.

FIG. 13 illustrates an example method 1300 for operating an extension device (e.g., the device 18 of FIGS. 1-2A). At 1304, an extension device (e.g., the device 18) communicates with a NFC device (e.g., the NFC device 22) over a NFC wireless communication link (e.g., the wireless communication link 26). Although not illustrated in FIG. 13, the extension device also communicates with a communication device (e.g., the device 14) over a wireless communication link (e.g., the wireless communication link 30).

Subsequent to communicating with the NFC device, at 1308, the extension device enters a low power mode of operation. For example, a timer keeps track of a time after the extension device last engaged in communication with the NFC device (and/or the communication device). Based on the timer exceeding a threshold period of time, the extension device enters the low power mode.

At 1312, while the extension device is in the low power mode, the extension device senses a user touching a finger print reader (e.g., finger print reader 264a) of the extension device. Based on the extension device sensing the user touching the finger print reader, at 1316, the extension device enters an active mode of operation, and loops back to 1304 of the method 1300.

Authentication and Security in an Extension Device

Figure 14A:
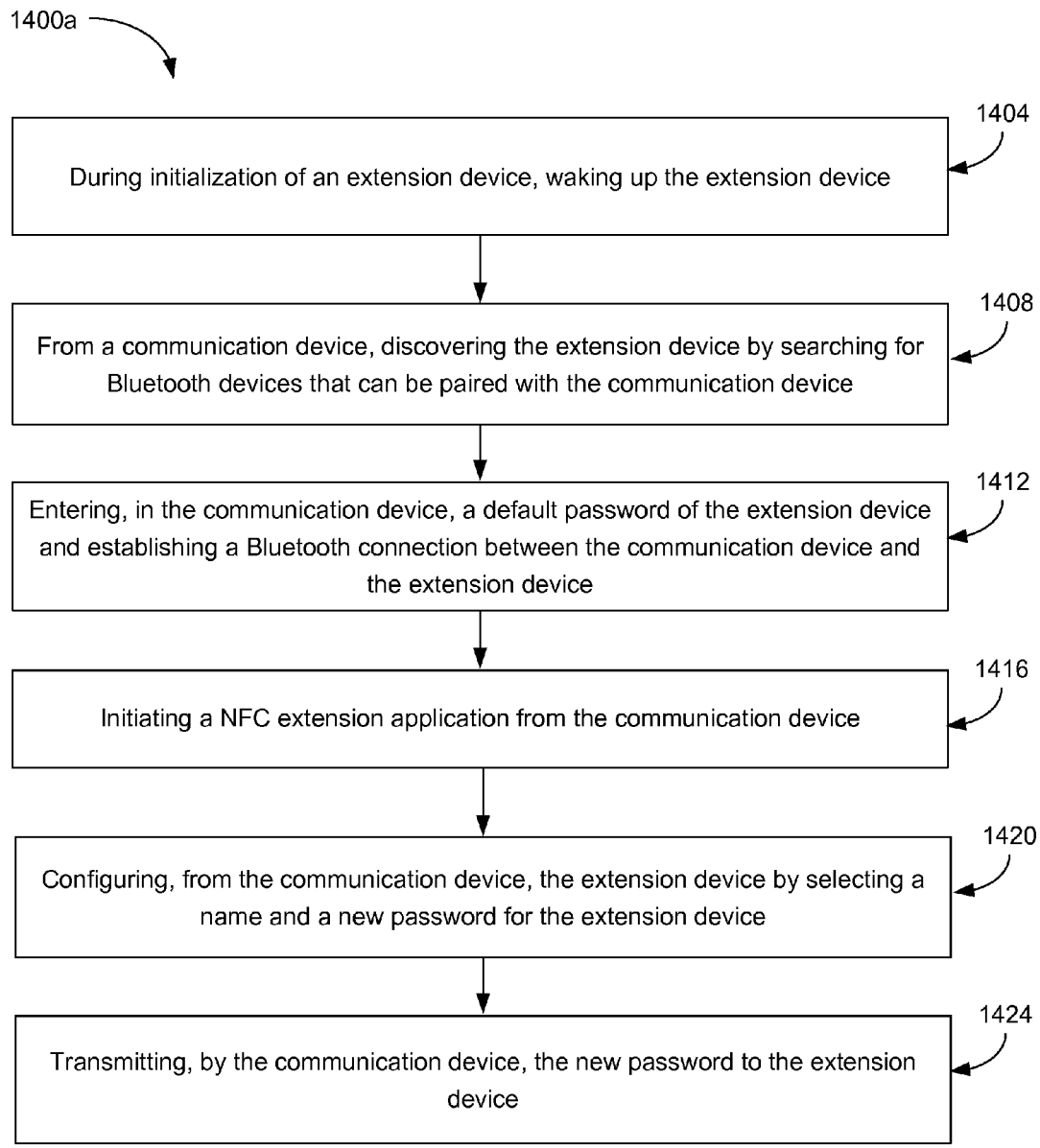
FIG. 14A illustrates an example method for initializing an extension device.

In an embodiment, during initialization of the device 18 (while the device 18 is to be used for the first time), it may be intended to pair the device 18 with a communication device, e.g., the device 14. For example, if the device 14 is a smart phone, the device 18 is paired with the device 14, while initializing the device 18. In another example, if the device 14 is an access point, the device 18 may not be paired with the device 14, while initializing the device 18. FIG. 14A illustrates an example method 1400a for initializing an extension device (e.g., the device 18).

At 1404, during initialization of an extension device (e.g., the device 18), the extension device is woken up. A user can wake up the extension device by, for example, touching a finger print reader (e.g., finger print reader 264a) of the extension device, activating the re-chargeable battery 276, charging the re-chargeable battery 276 (e.g., using a micro-USB port of the extension device), and/or the like.

At 1408, subsequent to waking up the extension device, the extension device is discovered by a communication device (e.g., device 14) by, for example, searching for Bluetooth devices that can be paired with the communication device. Once the extension device is discovered by the communication device, and an icon (or a name) of the extension device is displayed on a display screen of the communication device.

At 1412, a default password of the extension device is entered in the communication device. The default password of the extension device may be, for example, supplied by a manufacturer of the extension device along with the extension device. Additionally or alternatively, the default password may be provided from a point of sale of the extension device. Subsequent to entering the default password, a Bluetooth connection is established between the communication device and the extension device.

At 1416, a NFC extension application (e.g., NFC extension application 292 of FIG. 2B) is initiated by a user in the communication device. The NFC extension application can be, for example, downloaded by the communication device from a network (e.g., the Internet). Additionally or alternatively, the NFC extension application can be supplied (e.g., in an appropriate memory, e.g., a CD disk, a flash memory, etc.) to the user of the communication device when the user purchases the extension device. Additionally or alternatively, the NFC extension application can come pre-loaded in the communication device.

At 1420, the extension device is configured from the communication device using the NFC extension application running on the communication device. For example, a name and a new password for the extension device are selected by a user using the NFC extension application. The new password may be required to be different from the default password, for security purposes. The name and the new password are stored in the communication device. Although not illustrated in FIG. 14A, various other parameters associated with the extension device (e.g., a ring tone of the extension device, various security settings of the extension device, and/or the like) can also be configured. At 1424, the communication device (e.g., the NFC extension application running on the communication device) transmits the new password to the extension device using the wireless communication link 30.

FIG. 14A discusses the communication device communicating with the extension device via a Bluetooth wireless communication link during the initialization of the extension device. However, in another embodiment, at least some of the communication between the communication device and the extension device during the initialization of the extension device may be carried over, for example, a USB link coupled between the communication device and the extension device (e.g., using the USB connector of the device 18 illustrated in FIGS. 5A-6B).

Figure 14B:
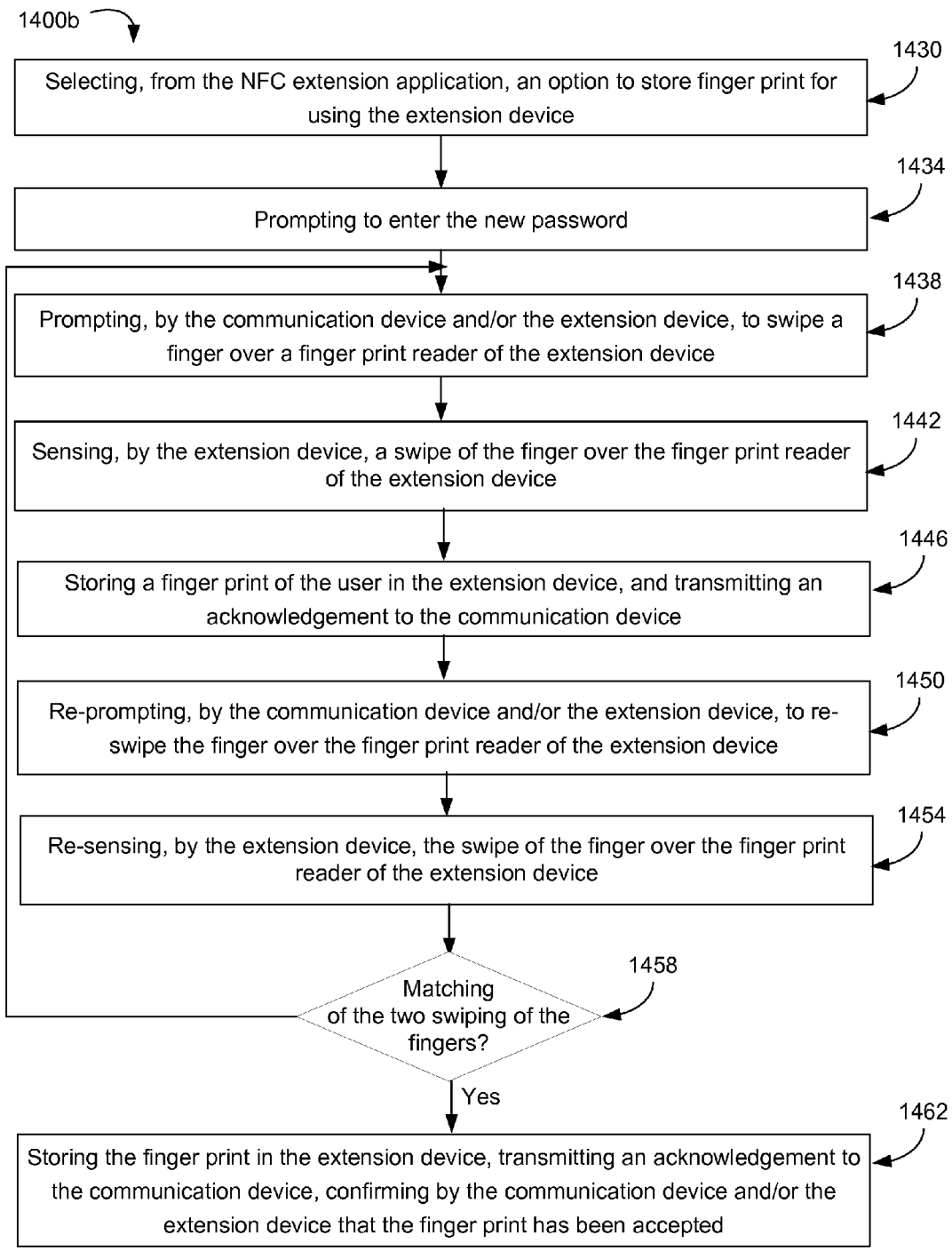
FIG. 14B illustrates an example method for storing a finger print of a user of an extension device in the extension device.

As previously discussed, in an embodiment, the finger print reader 264a is used to authenticate a user of the device 18. FIG. 14B illustrates an example method 1400b for storing a finger print of a user of an extension device (e.g., the device 18) in the extension device. In an embodiment, the method 1400b can be performed immediately after initializing the device 18 (FIG. 14A illustrates the method for initializing the device 18), or be a part of the initialization process. In another embodiment, the method 1400b can be performed any time after initializing the device 18.

Referring to FIG. 14B, at 1430, from the NFC extension application (e.g., NFC extension application 292) running in the communication device (e.g., the device 14), an option to store a finger print of an authorized user of the extension device (e.g., the device 18) is selected by a user of the device 18. At 1434, the NFC extension application prompts (e.g., via a display of the device 14) to enter the new password associated with the extension device (e.g., the password that was selected at 1420 of FIG. 14A).

In response to the user correctly entering the new password, at 1438, the communication device and/or the extension device prompts the user to swipe a finger over a finger print reader (e.g., the finger print reader 264a) of the extension device. For example, the communication device displays on the display of the communication device instructions to swipe a finger over the finger print reader. In another example, one or more LEDs in the vicinity of the finger print reader (e.g., one or more LEDs surrounding the finger print reader) blink, indicating a need for a finger print swiping.

A 1442, in response to the user swiping the finger over the finger print reader, the extension device senses the swiping of the finger over the finger print reader of the extension device. At 1446, the extension device stores the finger print of the user in the extension device (e.g., in the memory 224 of FIG. 2A), and transmits an acknowledgement (e.g., acknowledging that the finger print has been accepted) to the communication device.

At 1450, the communication device and/or the extension device re-prompt the user to re-swipe the finger over the finger print reader of the extension device. The re-swiping of the finger is intended, for example, to verify that the finger print is correctly sensed by the extension device. At 1454, in response to the user re-swiping the finger over the finger print reader, the extension device re-senses the swipe of the finger over the finger print reader of the extension device.

At 1458, the extension device determines if the finger prints sensed at 1442 and 1454 sufficiently matches (e.g., matches beyond a threshold level). If the two finger prints do not sufficiently match (e.g., if the user used two different fingers for the two finger prints, if the user didn't place the finger correctly during the finger print sensing, etc.), the user is re-prompted to swipe the finger over the finger print reader of the extension device and the method loops back at 1438. If the two finger prints sufficiently match, at 1462, the finger prints are stored in the extension device and the user is added to a list of authorized users of the extension device. An acknowledgement is transmitted to the communication device, to confirm that the finger print has been successfully recorded by the extension device and the user has been added to the list of authorized users of the extension device. The communication device and/or the extension device also confirm to the user of the device 18 that the finger print has been accepted. For example, the communication device displays a message that the finger print has been accepted, and/or the extension device displays (by blinking one or more LEDs) to indicate that the finger print has been accepted.

Although FIG. 14B illustrates the extension device storing the finger print, in another embodiment, the finger print can be stored in the communication device (e.g., instead of, or in addition to storing the finger print in the extension device). For example, in response to the extension device sensing the finger print at 1442, the extension device transmits the finger print to the communication device for storage. Although FIG. 14B illustrates storing a finger print of a user in the device 18, in an embodiment, finger prints of multiple users can be accepted and stored by the device 18 (i.e., multiple users can be added to the list of authorized users of the extension device). That is, multiple users (e.g., the owner of the device 18, his or her family members and friends, collogues, and/or the like) can be authorized to use the device 18 in conjunction with the device 14.

In an embodiment, the NFC extension application 292 includes options to delete one or more stored finger prints of one or more authorized users (e.g., one at a time, or multiple finger prints at a time), re-initialize (e.g., reset) the device 18, change the password associated with the device 18, etc. Executing such options require, for example, finger print swipe of an authorized user in the device 18 and/or entering the password in the device 14.

In an embodiment, the device 18 can be used for a plurality of purposes. For example, the NFC device 22 can be a passive NFC tag storing information about a product, and the device 18 can be used to receive the information about the product and transmit the information to the device 14. In another example, the NFC device 22 can be a NFC reader associated with a kiosk selling tickets for a train ride, and the device 14 can communicate with the NFC device 22 via the device 18 to buy tickets for the train ride. In the former example where the NFC device 22 is a passive NFC tag storing information about a product, no security or authentication may be required to use the device 18 to read information stored in the NFC device 22. On the other hand, in the later example where the NFC device 22 is a NFC reader associated with selling tickets for a train ride, authentication of the user of the device 18 is required for using the device 18 to communicate with the NFC device 22 (e.g., as secure financial information is transmitted by the device 18).

Figure 15:
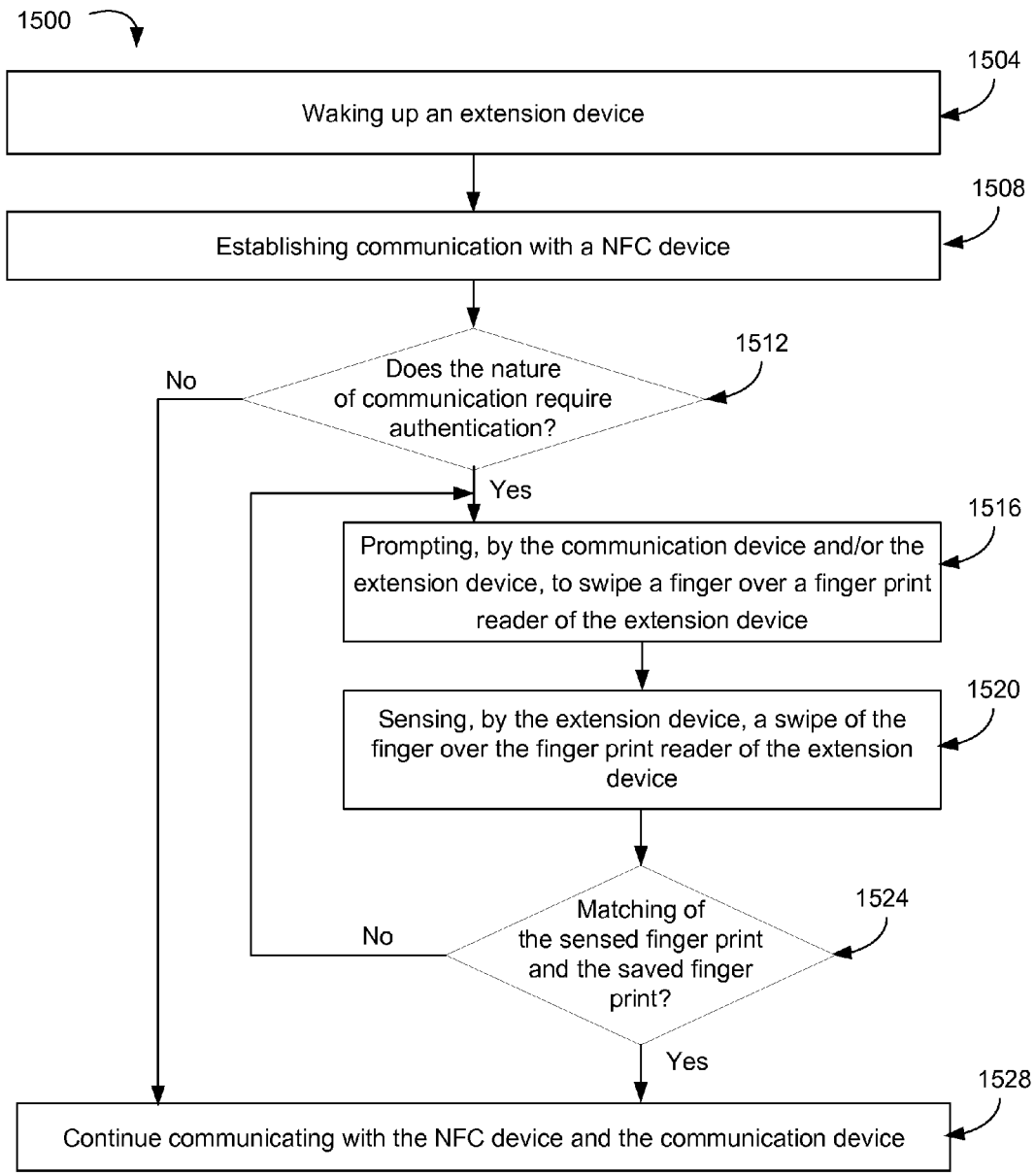
FIG. 15 illustrates an example method for selectively authenticating a user of an extension device to access the extension device.

FIG. 15 illustrates an example method 1500 for selectively authenticating a user of an extension device. Referring to FIGS. 1 and 15, at 1504, an extension device (e.g., the device 18) is woken up (e.g., by swiping, touching or tapping a finger over a finger print reader). In an embodiment, to merely wake up a device, it may not be necessary to fully swipe the finger over the finger print reader—a mere tapping or touch of the finger on the finger print reader can wake up the device. At 1508, communication between the extension device and a NFC device (e.g., the NFC device 22 of FIG. 1) is established over a NFC wireless communication link (e.g., the wireless communication link 26 of FIG. 1). For example, the extension device is placed proximally to the NFC device to establish the communication between the extension device and the NFC device.

At 1512, the extension device and/or a communication device (e.g., the device 14, with which the extension device communicates via the wireless communication link 30) determine if the nature of communication with the NFC device requires authentication. An NFC extension application (e.g., the NFC extension application 292) running in the communication device can be appropriately configured to indicate whether the communication requires authentication. In an example, if the communication involves exchanging secure, confidential and/or financial information between the communication device and the NFC device (e.g., while buying a ticket for a train ride using the extension device, validating a season ticket for the train ride using the extension device, and/or the like), such a communication can require authentication of the user of the extension device. In another example, all communication involving the extension device can require authentication. In yet another example, if a financial value associated with the communication exceeds a threshold value (e.g., if the extension device is used for a financial transaction exceeding $10), user authentication can be required.

If authentication is required (e.g., if "Yes" at 1512), then at 1516, the communication device and/or the extension device prompts the user to swipe a finger over the finger print reader of the extension device (e.g., as discussed with respect to 1438 of FIG. 14B). At 1520, in response to the user swiping the finger, the extension device senses the swiping of the finger over the finger print reader of the extension device.

At 1524, the extension device compares the sensed finger print with a previously saved finger print of the user (e.g., saved at 1462 of FIG. 14B). If the sensed finger print matches with the previously saved finger print of an authorized user (i.e., if "Yes" at 1524), then at 1528 the user of the extension device is authenticated, and the extension device continues communicating with the NFC device and the communication device, e.g., as illustrated in FIG. 1. If the sensed finger print does not match with the previously saved finger print of the authorized user (i.e., if "No" at 1524), the method 1500 loops back to 1516, where the communication device and/or the extension device prompts the user to re-swipe a finger over the finger print reader of the extension device.

If at 1512 it is determined that no authentication is required (e.g., if "No" at 1512), the method 1500 proceeds to 1528, where the extension device continues communicating with the NFC device and the communication device, e.g., as illustrated in FIG. 1.

In an embodiment and although not illustrated in FIG. 15, the user may know in advance, e.g., while waking up the extension device at 1504 of the method 1500, that the user is to use the extension device for a secure or financial transaction, which requires verifying the finger print of the user to complete the transaction. In such a case, while waking up the extension device at 1504, the user performs a full swipe of the finger on the finger print reader of the extension device (e.g., instead of merely touching or tapping the finger on the finger print reader of the extension device). Such a full swipe of the finger wakes up the extension device, as well as authenticates the user for the secure or financial transaction. Accordingly, the operations at 1516 and 1520 of the method 1500 may be redundant, as the user has already swiped the finger over the finger print reader of the extension device. Subsequent to the user swiping the finger over the finger print reader of the extension device, the extension device is awaken and the method 1500 jumps to 1524, in which the sensed finger print is matched with the saved finger print.

As discussed with respect to FIGS. 14A, 14B and 15, the password (which is set at 1420 of FIG. 14A) is stored in both the devices 14 and 18. Also, a finger print of an authorized user of the device 14 is stored in the device 18. In an embodiment, to add a new finger print of a new user of the device 14 (or to delete a previously stored finger print of an already authorized user), the password is needed to be entered in the device 14. In an embodiment, to change the password of the device 14, an authorized user has to swipe a finger on the finger print reader 264a of the device 18. Also, the authorized user has to swipe the finger on the finger print reader 264a of the device 18 for secure transactions.

Thus, in case the device 14 and/or the device 18 are lost or stolen, an unauthorized user cannot add himself or herself as an authorized user of the device 18 (e.g., for adding a new finger print, one needs to know the password, which will be unknown to the unauthorized user). Similarly, in case the device 14 and/or the device 18 are lost or stolen, the unauthorized user cannot change the password of the device 18 (e.g., for changing the password, an authorized user has to swipe his or her finger on the finger print reader 264a of the device 18). Furthermore, in case the device 14 and/or the device 18 are lost or stolen, an unauthorized user cannot use the device 18 for secure communication with the NFC device 22 (e.g., as discussed with respect to FIG. 15, an authorized user has to swipe his or her finger on the finger print reader 264a of the device 18 for a secure transaction). Accordingly, if the device 14 and/or the device 18 is lost or stolen, there is little or no risk of misusing the device 18.

In an embodiment, the wireless communication link 30 between the devices 18 and 14 can also be secured and encrypted. For example, as previously discussed, in an embodiment, the device 18 includes a USB port. In an embodiment, the device 18 is coupled to the device 14 over a USB link, and an encryption key is entered in the device 14 (or self generated by the NFC extension application 292) by a user of the device 14. The encryption key is then transmitted to the device 18 over the USB link, and the devices 14 and 18 use the encryption key for communicating over the wireless communication link 20. In another embodiment, the encryption key is generated in a different manner. For example, the device 18 is coupled to another communication device (i.e., other than the device 14, e.g., a computer) over a USB link, and the another communication device generates (or receives from a user) the encryption key. The another communication device then transmits the encryption key to the device 18 over the USB link. Subsequently, the device 14 is coupled to the another communication device (e.g., using a USB link), and the another communication device then transmits the encryption key to the device 14 over a USB link. Once both the devices 14 and 18 receive the encryption key, the devices 14 and 18 use the encryption key for communicating over the wireless communication link 30.

In an embodiment, the device 18 may not have a USB port. Accordingly, a USB link cannot be used to transmit the encryption key to the device 18. In such an embodiment, a passive NFC tag (which may be supplied by the seller of the device 18, or may be acquired from another source) stores an encryption key. The NFC tag can also have the encryption key printed onto the NFC tag. The device 18 acquires the encryption key by reading the NFC tag. The encryption key is also entered in the device 14 manually by a user (e.g., by reading the encryption key printed on the NFC tag, and manually entering the encryption key using a key pad of the device 14). Alternatively, the device 14 can have NFC tag reading capability, and can directly read the encryption key from the NFC tag. Once both the devices 14 and 18 receive the encryption key, the devices 14 and 18 use the encryption key for communicating over the wireless communication link 30.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. For example, although embodiments are described in connection with NFC, other communication protocols can be used to implement techniques described herein. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. An apparatus comprising:
   a processor;
   a first antenna;
   a second antenna;
   a near field communication (NFC) module coupled to the first antenna; and
   a Bluetooth module coupled to the second antenna,
   wherein the apparatus is configured to be discovered by a communication device over a Bluetooth wireless communication link,
   wherein subsequent to the apparatus being discovered by the communication device and in response to a user of the apparatus entering a default password in the communication device, the apparatus is configured by the communication device such that (i) the NFC module communicates with a NFC device via the first antenna over a NFC wireless communication link, and (ii) the Bluetooth module communicates with the communication device via the second antenna over the Bluetooth wireless communication link,
   wherein the apparatus maintains a list of authorized users of the apparatus, wherein the list of authorized users of the apparatus includes the user, wherein in response to the communication device receiving a command to remove the user from the list of authorized users of the apparatus, the communication device is configured to (i) prompt to enter a password in the communication device, (ii) receive a password in the communication device, and (iii) in response to the received password matching a stored password, transmit a request to the apparatus to remove the user from the list of authorized users of the apparatus, wherein the apparatus is configured to receive the request from the communication device to remove the user from the list of authorized users of the apparatus, and wherein in response to the apparatus receiving the request from the communication device to remove the user from the list of authorized users of the apparatus, the apparatus is configured to (i) remove a first finger print of the user from a memory of the apparatus, and (ii) delete the user from the list of authorized users of the apparatus.

2. The apparatus of claim 1, wherein the apparatus is configured to, based on the user entering a new password in the communication device, receive the new password from the communication device while the apparatus is being configured by the communication device.

3. The apparatus of claim 1, further comprising:
a finger print reader configured to sense a swiping of a finger of the user over the finger print reader; and
the memory configured to store the first finger print of the user in response to the finger print reader sensing the swiping of the finger of the user over the finger print reader.

4. The apparatus of claim 3, wherein:
subsequent to the memory storing the first finger print of the user, the finger print reader is configured to re-sense another swiping of the finger of the user over the finger print reader; and
in response to the finger print reader re-sensing the another swiping of the finger of the user over the finger print reader, the apparatus is further configured to store the first finger print of the user in the memory and (ii) add the user to the list of authorized users of the apparatus.

5. The apparatus of claim 4, wherein: in response to the first finger print of the user substantially matching with the second finger print of the user, the Bluetooth module is configured to transmit to the communication device an acknowledgement acknowledging that (i) the first finger print of the user has been recorded in the apparatus and (ii) the user has been added to the list of authorized users of the apparatus.

6. The apparatus of claim 3, further comprising:
a display configured to prompt the user to swipe the finger of the user over the finger print reader.

7. The apparatus of claim 3, wherein the display comprises a light emitting diode (LED).

8. The apparatus of claim 1, further comprising:
an integrated circuit chip comprising the processor, the Bluetooth module and the NFC module.

9. The apparatus of claim 1, further comprising:
a clock generation module configured to generate a clock signal for use by various components of the apparatus;
a rechargeable battery; and
an Universal Serial Link (USB) interface configured to establish a USB link with the communication device, wherein the USB link is used by the apparatus to one or both of (i) recharge the rechargeable battery using power received from the communication device over the USB link, and (ii) configure the apparatus from the communication device.

10. A method for facilitating an operation of an extension device that acts as an extension of a communication device for communicating with a near field communication (NFC) device, wherein the NFC device operates in accordance with NFC standards, the method comprising:
discovering, by the communication device, the extension device over a first wireless communication link;
receiving, by the communication device, a default password associated with the extension device; and
in response to receiving the default password associated with the extension device, configuring, by the communication device, the extension device such that the extension device communicates (i) with the communication device over the first wireless communication link and (ii) with the NFC device over a second wireless communication link;
facilitating in adding a user to a list of authorized users of the extension device;
receiving a command to remove the user from the list of authorized users of the extension device; and
in response to receiving the command to remove the user from the list of authorized users of the extension device,
prompting to enter a password in the communication device,
in response to prompting to enter the password in the communication device, receiving a password in the communication device, and
in response to the received password matching a stored new password, transmitting a request to the extension device to (i) remove the user from the list of authorized users of the extension device and (ii) delete a first finger print of the user from the extension device.

11. The method of claim 10, wherein configuring the extension device further comprises:
receiving the new password associated with the extension device.

12. The method of claim 11, further comprising:
transmitting, by the communication device, the new password to the extension device.

13. The method of claim 11, wherein facilitating in adding the user to the list of authorized users of the extension device further comprises:
prompting the user of the extension device to swipe a finger of the user over a finger print reader of the extension device, wherein in response to the user swiping the finger of the user over the finger print reader of the extension device, the extension device (i) senses the first finger print of the user and (ii) stores the first finger print of the user.

14. The method of claim 13, wherein facilitating in adding the user to the list of authorized users of the extension device further comprises:
subsequent to the extension device storing the first finger print of the user, re-prompting the user of the extension device to swipe the finger of the user over the finger print reader of the extension device, wherein in response to the user re-swiping the finger of the user over the finger print reader of the extension device, the extension device (i) senses a second finger print of the user and (ii) compares the first finger print of the user with the second finger print of the user; and
in response to the first finger print of the user substantially matching with the second finger print of the user, receiving, by the communication device from the extension device, an acknowledgement acknowledging that (i) the first finger print of the user has been recorded in the extension device and (ii) the user has been added to the list of authorized users of the extension device.

15. The method of claim 10, wherein the first wireless communication link is a Bluetooth communication link.

16. The method of claim 10, wherein the second wireless communication link is a NFC communication link.

17. The method of claim 10, wherein the communication device is one of a mobile telephone, a smart phone, a cellular telephone, a mobile computer, a handheld computer, a laptop computer, a tablet computer, a palmtop, an access point, and a personal digital assistant (PDA).

* * * * *